United States Patent [19]

Kogel et al.

[11] 4,017,256

[45] Apr. 12, 1977

[54] PROCESS FOR THE PRINTING AND PAD-DYEING OF MIXED FABRIC

[75] Inventors: Gerhard Kogel, Reinach; Roberto Degen; Walter Mundwiler, both of Basel, all of Switzerland

[73] Assignee: Ciba-Geigy Corporation, Ardsley, N.Y.

[22] Filed: Mar. 24, 1975

[21] Appl. No.: 561,514

[30] Foreign Application Priority Data

Mar. 28, 1974 Switzerland .................... 4359/74

[52] U.S. Cl. .................... 8/21 C; 8/41 C; 8/43; 8/54; 8/54.2; 8/163
[51] Int. Cl.² .................................. D06P 3/82
[58] Field of Search ............ 8/21 C, 41 C, 43, 163

[56] References Cited

UNITED STATES PATENTS

| | | | |
|---|---|---|---|
| 3,266,863 | 8/1966 | Price | 8/44 |
| 3,494,716 | 2/1970 | Hoffman | 8/21 |
| 3,642,424 | 2/1972 | Lowenfeld | 8/21 |
| 3,713,767 | 1/1973 | Lowenfeld | 8/21 C |
| 3,767,356 | 10/1973 | Turner | 8/21 C |

FOREIGN PATENTS OR APPLICATIONS

| | | |
|---|---|---|
| 2,231,245 | 1/1974 | Germany |
| 1,177,597 | 9/1964 | Germany |
| 7,308,879 | 12/1973 | Netherlands |
| 7,304,171 | 4/1974 | South Africa |

OTHER PUBLICATIONS

Dupont Dacron Bulletin, "Printing and Finishing Fabrics of Dacron Polyester"-Bulletin D—2b2, June 1972.
DuPont, "Dyes and Chemicals Technical Bulletin" 1975 (July) vol. 31, No. 1.
Fortess et al., "American Dyestuff Reporter" 1963 (May 27) pp. 16–25.

Primary Examiner—Joseph L. Schofer
Assistant Examiner—A. L. Clingman
Attorney, Agent, or Firm—Karl F. Jorda; Edward McC. Roberts; Prabodh I. Almaula

[57] ABSTRACT

Described is a process for the printing and pad-dyeing of mixed fabric made from fiber mixtures consisting of material consisting of materials dyeable with disperse dyestuffs and materials dyeable with reactive dyestuffs, especially polyesters/cotton, by the use of printing pastes or padding liquors containing at least one disperse dyestuff of the azo series and at least one reactive dyestuff, wherein there is used a printing paste or padding liquor in which the disperse dyestuff is formed in the printing paste or padding liquor. There are obtained by this process printing or dyeings which have some advantages over the prior art. The staining of the cellulose constituent can more easily be washed out and only a slight staining of white ground occurs.

8 Claims, No Drawings

PROCESS FOR THE PRINTING AND PAD-DYEING OF MIXED FABRIC

The invention relates to an improved process for the printing and pad-dyeing of mixed fabric made from fibre mixtures consisting of materials dyeable with disperse dyestuffs and materials dyeable with reactive dyestuffs, to the production of the printing pastes and padding liquors used for this purpose, to the printing pastes and padding liquors themselves, as well as to the mixed fabric printed and dyed with these printing pastes and padding liquors.

Printing pastes for the coloured printing of mixed fabric are known. In these printing pastes, the dyestuffs in their commercial form are added at the beginning. There is thus used, e.g. for the printing of a mixed fabric made from polyester/cotton, a printing paste in which is incorporated a dyestuff mixture of a disperse dyestuff and a reactive dyestuff. The employment of such printing pastes as well as the printing paste as such has, however, certain disadvantages. A commercial disperse dyestuff contains, for instance, a dispersing agent in order to ensure a satisfactory dispersion in the printing paste. Depending on the nature of the dispersing agent, however, there can occur a reaction of the reactive dyestuff with these dispersing agents. Moreover, it has not been possible by these known processes to obtain brilliant shades, especially in the red sector.

A serious disadvantage is, however, that the staining of the cellulose constituent caused by the commercial disperse dyestuff, which staining is not fast and deviates in shade, is removable only with difficulty by an intensive washing process; and that only by careful control of the washing process and by the use of special auxiliaries can the unfixed disperse dyestuff that has dissolved into the washing bath be prevented from becoming re-absorbed onto the white ground (unprinted areas).

It has now been found that, surprisingly, a printing paste or padding liquor in which the disperse dyestuff is not formed until in the printing paste or padding liquor has, compared with a printing paste or padding liquor in which all dyestuffs are added in their finished state, appreciable technical advantages: these are, in particular, the elimination of the initially mentioned drawbacks, so that, for instance, the attainment of more brilliant and more pure shades, especially in the red sector, is rendered possible; and the fact that there occurs no reaction between the reactive dyestuff and the dispersing agents contained in commercial disperse dyestuffs, since there is provided the possibility of the type and amount of dispersing agent being so chosen that no reaction with reactive dyestuffs occurs. Furthermore, a printing paste or padding liquor of this kind causes less staining of the natural fibre constituent such as, e.g., the cotton; the unfixed disperse dyestuff can moreover easily be washed out, and has, even without the presence of special auxiliaries, practically no tendency to again become absorbed, from the washing bath, onto the material. In addition, it is cheaper in overall production. Such a printing paste or padding liquor in which the disperse dyestuff is produced, in the form of an azo dyestuff, actually in the printing paste or padding liquor, whilst the reactive dyestuff is added in the commercial form, is obtained according to the invention by a process in which a coupling component is mixed, in the presence of alkalies, with a pasting agent such as, e.g., alcohol or Turkey-red oil; this mixture is dissolved in water at a temperature of about 10° to 40° C, particularly 15° to 25° C; there is advantageously added an anionic or nonionic dispersing agent; and, finally, the diazo constituent is added, e.g., in the form of a stabilised dye salt or as a diazotised dye base. Subsequently, the printing paste or padding liquor is optionally neutralised, thickening agent and reactive dyestuff, as well as the agents necessary for fixation of reactive dyestuffs are added, and the total volume is then made up with water.

Coupling components suitable for producing a printing paste or padding liquor of this kind are known; they can be of the most varied nature chemically; reference may be made, e.g., to the 'Azoic Coupling Components' having a naphthol base which are given in the Colour Index, third Edition, Vol. 1, published by THE SOCIETY OF DYERS AND COLOURISTS (1971).

Also heterocyclic coupling components can be used in the process according to the invention, e.g. such as are described in the German Offenlegungsschrift No. 2,231,245, particularly the hydroxypyridones specified therein.

The diazo components to be used are likewise known and are given, e.g., in the mentioned Colour Index under 'Azoic Diazo Components'.

The dispersing agents of anionic or nonionic nature, which can be added to the printing paste or padding liquor, serve, in particular, to produce a good fine distribution and hence better fastness to rubbing. In a preliminary test, however, it will be advantageously determined which of the dispersing agents being applied undergo no reaction with the reactive dyestuff used, in order that undesirable attendant phenomena may be eliminated. For example, suitable anionic dispersing agents are:

1. sulphated primary or secondary, purely aliphatic alcohols of which the alkyl chain has 8 to 18 carbon atoms, e.g. sodium lauryl sulphate, potassium-$\alpha$-methylstearyl sulphate, sodium tridecyl sulphate, sodium oleyl sulphate, potassium stearyl sulphate, or the sodium salts of coconut oil alcohol sulphates;

2. sulphated unsaturated higher fatty acids or fatty acid esters, such as oleic acid, elaidic acid or ricinoleic acid, or lower alkyl esters thereof, e.g. ethyl ester, propyl ester or butyl ester, and the oils containing such fatty acids, such as olive oil, castor oil or rape oil;

3. the addition products, converted into an acid ester with the aid of an organic dicarboxylic acid such as maleic acid, malonic acid or succinic acid, preferably however with an inorganic polybasic acid such as o-phosphoric acid or especially sulphuric acid, of 1 to 20 moles of ethylene oxide with fatty amines, fatty acids or aliphatic alcohols having 8 to 20 carbon atoms in the alkyl chain, e.g. with stearylamine, oleylamine, stearic acid, oleic acid, lauryl alcohol, myristyl alcohol, stearyl alcohol or oleyl alcohol, such as, e.g., the ammonium salt of sulphated lauryl alcohol triglycol ether, or of 1 to 5 moles of ethylene oxide with alkylphenols, such as the acid sulphuric acid ester of the addition product of 2 moles of ethylene oxide with 1 mole of p-nonylphenol, the acid sulphuric acid ester of the addition product of 1.5 moles of ethylene oxide with 1 mole of p-tert.octylphenol, the acid sulphuric acid ester of the addition product of 5 moles of ethylene oxide with 1 mole of p-nonylphenol, the acid phosphoric acid ester of the addition product of 2 moles of ethylene oxide with 1 mole of p-nonylphenol, the acid maleic acid ester of the addition product of 2 moles of ethylene oxide with 1 mole of p-nonylphenol;

4. sulphated esterified polyoxy compounds, e.g. sulphated partially esterified polyvalent alcohols such as the sodium salt of the sulphated monoglyceride of palmitic acid; instead of sulphates, it is possible also to use esters with other polyvalent mineral acids, e.g. phosphates;

5. primary and secondary alkylsulphonates, the alkyl chain of which contains 8 to 20 carbon atoms, e.g. ammonium decylsulphonate, sodium dodecylsulphonate, sodium hexadecanesulphonate-8, sodium stearylsulphonate;

6. alkylarylsulphonates, such as alkylbenzenesulphonates with a straight-chain or branched-chain alkyl chain having at least 7 carbon atoms, e.g. sodium dodecylbenzenesulphonate, 1,3,5,7-tetramethyloctylbenzenesulphonate, sodium octadecylbenzenesulphonate; such as alkylnaphthalenesulphonates, e.g. sodium-1-iso-propylnapthalene-2-sulphonate, sodium dibutylnaphthalenesulphonate; or such as dinapthylmethanesulphonates, e.g. the disodium salt of di-(6-sulphonaphthyl-2)-methane;

7. sulphonates of polycarboxylic acid esters, e.g. sodium dioctylsulphosuccinate or sodium dihexyl-sulphophthalate;

8. the sodium, potassium, ammonium, N-alkyl, N-hydroxyalkyl, N-alkoxyalkyl or N-cyclohexylammonium or hydrazinium and morpholinium salts of fatty acids having 10 to 20 carbon atoms, designated as soaps, such as lauric, palmitic, stearic or oleic acid, of naphthenic acids, of resinic acids such as abietic acid, e.g. the so-called rosin soap;

9. esters of polyalcohols, especially mono- or diglycerides of fatty acids having 12 to 18 carbon atoms, e.g. the monoglycerides of lauric, stearic, palmitic or oleic acid, as well as the fatty acid esters of sugar alcohols such as sorbite, sorbitans and saccharose, for example sorbitan monolaurate (Span 20), sorbitan palmitate (Span 40), sorbitan stearate (Span 60), sorbitan oleate (Span 80), sorbitan sesquioleate, sorbitan trioleate (Span 85), or oxyethylation products thereof (Tween).

As nonionic dispersing agents there are mentioned, for example:

1. addition products of preferably 5 to 50 moles of alkylene oxides, especially of ethylene oxide, whereby some ethyleneoxy units can be replaced by substituted epoxides such as styrene oxide and/or propylene oxide, with higher fatty acids or with saturated or unsaturated alcohols, mercaptans or amines having 8 to 20 carbon atoms, or with alkylphenols or alkylthiophenols of which the alkyl radicals have at least 7 carbon atoms;

2. reaction products from higher molecular fatty acids and hydroxyalkylamines. These can be produced, for example, from higher molecular fatty acids, preferably from those having about 8 to 20 carbon atoms, e.g. caprylic acid, stearic acid, oleic acid and, in particular, from the acid mixture denoted by the collective term "coconut-oil fatty acid", and hydroxyalkylamines such as triethanolamine or preferably diethanolamine, as well as mixtures of these amines, whereby the reaction is carried out with the molecular ratio between hydroxyalkylamine and fatty acid being greater than 1, e.g. 2:1. Such compounds are described in the U.S. Patent No. 2,089,212.

3. alkylene oxide condensation products, particularly ethylene oxide condensation products, whereby some ethyleneoxy units can be replaced by substituted epoxides such as styrene oxide and/or propylene oxide.

Normally, the anionic dispersing agents are in the form of their alkali salts, their ammonium salts or their water-soluble amine salts, for example the salt with dihydroxyethylamine.

It is also possible to use mixtures consisting of one of the mentioned nonionic dispersing agents with an anionic dispersing agent.

Suitable reactive dyestuffs for the printing paste of the invention are anionic water-soluble dyestuffs of which the anionic character is due to metal-complex formation alone and/or to the substituents effecting water-solubility. Such substituents producing water-solubility are carboxylic acid groups, phosphoric acid groups, acylated sulphonic acid imide groups such as alkyl- or aryldisulphimide groups or alkyl- or arylcarbonylsulphimide groups, and, in particular, sulphonic acid groups. Especially good results are in general obtained with dyestuffs containing at least one sulphonic acid group.

The reactive dyestuffs can belong to the most varied dyestuff classes; they are, e.g., oxazine, triphenylmethane, xanthene, nitro, acridone, stilbene, perinone, naphthoquinoneimine and phthalocyanine dyestuffs, particularly, however, anthraquinone dyestuffs and azo dyestuffs. The last-mentioned can be metal-free, metal-lisable or metal-containing mono-, dis- and polyazo dyestuffs wherein the metal atom forms a 1:1- or 1:2-complex, such as a 1:1-copper, 1:2-chromium or 1:2-cobalt complex, which contain two identical or two different molecules of azo dyestuff bound in complex linkage with a chromium or cobalt atom, as well as formazan dyestuffs.

These dyestuffs possess in the molecule fibre-reactive groupings which are capable of forming a covalent bond with the cellulose material. These fibre-reactive groupings can be bound directly, or by way of bridge-members such as oxygen, sulphur, an imino, methyleneimino, carbonylimino, sulphonylimino or urea bridge, to the chromophoric structure of the dyestuff, preferably to an aromatic ring.

The following may be mentioned as examples of such fibre-reactive groupings: the radical of an acid containing at least one reactive halogen atom and/or one multiple bond capable of addition, e.g. chloro- or bromoacetic acid, $\beta$-chloro- and $\beta$-bromopropionic acid, $\alpha,\beta$-dibromopropionic acid, tetrahalocyclobutanecarboxylic acid such as 2-chloro-2-fluoro-3,3-difluoro- or 2,2,3,3-tetrafluoro-cyclobutane-1-carboxylic acid, propiolic acid, acrylic acid, methacrylic acid, $\alpha$-chloro, $\beta$-chloro-$\alpha$-bromo- and $\beta$-bromoacrylic acid, $\alpha,\beta$- and $\beta,\beta$-dichloroacrylic acid or $\alpha,\beta$- and $\beta,\beta$-dibromoacrylic acid, trichloro- or tribromoacrylic acid, 2-(2,2,3,3-tetrafluorocyclobutyl-1)-acrylic acid, crotonic acid, $\alpha$- or $\beta$-chlorocrotonic acid or $\alpha$- or $\beta$-bromocrotonic acid, $\alpha,\beta$-dichlorocrotonic acid, maleic acid, monochloro- and monobromomaleic acid, dichloro- and dibromomaleic acid, fumaric acid, monochloro- and monobromofumaric acid, dichloro- and dibromofumaric acid, fumaric acid monoester, dichloro- and dibromosuccinic acid, vinylsulphonic acid, $\beta$-chlorovinylsulphonic acid, or of a nitrohalobenzoic acid or nitrohalobenzenesulphonic acid having a reactive halogen atom, especially having fluorine or chlorine in the o- or p-position with respect to the nitro group, such as the radical of 3-nitro-4-fluorobenzoic acid or 3-nitro-4-fluorobenzenesulphonic acid; also 3-methylsulphonyl- 4-fluorobenzoic acid or 2-methylsulphonyl-5-fluoro-4-benzoic acid, as well as β-hydroxyalkylsulphonyl, -sulphamoylsulphonamido or -carbonamido groups esterified with strong acids, such as th β-haloethylsulphonyl, β-sulphatoethylsulphonyl, β-sulphatoethylsulphamoyl, β-sulphatoethyl-N-methylsulphonamido or β-sulphatopropionamido group, the β-alkyl- or β-phenylsulphonylalkyl-sulphonyl, -sulphonamido or -carbonamido group, e.g. the β-phenylsulphonylpropionamido group. Also suitable is the radical of an aromatic nitrogen heterocycle having advantageously more than one ring hetero atom, which radical contains at least one reactive halogen atom such as fluorine, chlorine or bromine, or an ammonium group or sulphonic acid group or alkylsulphonyl group on a ring carbon atom. The following are given as examples of such reactive groups: the triazinyl radical having at least one reactive halogen atom, e.g. the radical of cyanuric chloride, cyanuric bromide or their primary condensation products in which a halogen atom is replaced by the optionally further-substituted radical of a primary or secondary aliphatic, alicyclic, aromatic or heterocyclic amine, especially by aniline or its alkyl and sulphonic acid or carboxylic acid derivatives, by lower mono- and dialkylamines, as well as by ammonia, or by the radical of an aliphatic, alicyclic, aromatic or heterocyclic hydroxy or thiol compound. Of interest in this connection are also monochlorotriazines, to which is bound the radical of an alcohol and advantageously of an etherified dialcohols, and which correspond to the general formula

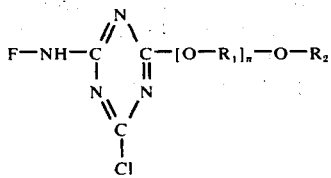

wherein
F represents the radical of a dyestuff,
$R_1$ represents an alkylene radical and
$R_2$ represents an alkyl radical, and
$n$ is 0 or 1.
The radicals $R_1$ and $R_2$ can be straight-chain or branched-chain.

Also mentioned is the diazinyl radical such as the di- or trihalopyrimidyl radical, e.g. the 2,4-di- or, in particular, 2,4,5-trichloro-, -bromo-, -fluoro-, 5-bromo- or 5-chloro-2,4-difluoro- or 5-bromo-2,4-dichloropyrimidyl-6-radical. The dihalopyrimidyl radical can carry in the 5-position, for example, also the following substituents: methyl, ethyl, nitro, cyano, carboxylic acid amide or sulphonic acid amide optionally substituted on the nitrogen atom, carboxylic acid methyl ester or carboxylic acid ethyl ester, acyl, e.g. benzoyl, alkenyl, e.g. allyl, chlorovinyl, substituted alkyl, e.g. carboxymethyl, chloro- or bromomethyl.

Further suitable nitrogen heterocycles are, e.g., the radical of a dihalopyrimidinecarboxylic acid, of 2,3-dihaloquinoxalinecarboxylic acid or 2,3-dihaloquinoxalinesulphonic acid, of 2-halo- or 2-methylsulphonylbenzothiazole- or -oxazolecarboxylic acid or -sulphonic acid, of 1,4-dihalophthalazinecarboxylic acid, of 2,4-dihaloquinazolinecarboxylic acid or of 4,5-dihalo-6-pyridazon-1-yl-alkylene- or -phenylcarboxylic acid, such as the acid radicals of 2,4-difluoro- or 2,4-dichloropyrimidine-5- or -6-carboxylic acid, 2,4-dichloro-6-chloromethylpyrimidine-5-carboxylic acid, 2,3-difluoro- or 2,3-dichloro-quinoxaline-6-carboxylic acid or -6-sulphonic acid, 2-chlorobenzothiazole- or -oxazole-5- or -6-carboxylic acid or -5- or -6-sulphonic acid, 1,4-difluoro-, 1,4-dichloro- or 1,4-dibromophthalazine-6-carboxylic acid or -6-sulphonic acid, 2,4-dichloroquinazoline-6- or -7-carboxylic acid, 2,3-dichloroquinoxaline-7-carboxylic acid or -7-sulphonic acid, 4,5-dichloro-6-pyridazon-1-yl-trimethylenecarboxylic acid or -1',4'-phenylene-carboxylic acid.

Also suitable are the radicals: trichloropyridazinyl, dichloro-1,2,4-triazinyl, 3-chloro-pyridazine-6-carboxylic acid, 5-chloro-1,2,4-thiadiazol-3-yl-1',4'-phenylenecarboxylic acid, allylsulphone and allylsulphide. To be mentioned also are reactive "onium dyestuffs" which carry, e.g., instead of a reactive halogen atom or an ester group, a reactive ammonium, quinuclidinium, pyridinium, hydrazinium or sulphonium radical.

These reactive dyestuffs can be present in the printing paste or padding liquor on their own or in the form of mixtures of such reactive dyestuffs. Moreover, the reactive radical as defined can be present in the dyestuff molecule once or more than once.

The printing pastes and padding liquors according to the invention are adequately stable in storage, and are used for printing and dyeing mixed fabrics made from fibre mixtures consisting of materials dyeable with disperse dyestuffs and with reactive dyestuffs such as, e.g., polyester/wool, especially polyester/cellulose and, in particular, polyester/cotton mixed fabric.

In a printing or dyeing process of this kind, the mixed fabric is printed or pad dyed in an initial stage with the printing paste or padding liquor obtained according to the invention and intermediately dried, and the dyestuffs are then fixed on the mixed fabric.

The fixing can be performed by a standard method for both dyestuff types: it can be performed, for example, by thermofixing or HT-steaming, or by the respective specific methods for disperse dyestuffs and reactive dyestuffs, such as, e.g., pressure steaming for disperse dyestuffs, alkali shock process, cold-storage process and 2-phase-steaming process for reactive dyestuffs.

After the fixed treatment, the material is finished by known methods.

There are obtained by these processes, with the use of the printing pastes or padding liquors produced according to the invention, printings or dyeings which have the initially mentioned advantages, especially that of being more easily washed out, and which are very deeply coloured; in the case of printings, only a slight staining of the white ground occurs.

The invention is illustrated by the following examples without being limited by them. The employed reactive dyestuffs are in the commercial form.

A. PREPARATION OF THE PRINTING PASTES

EXAMPLE 1

8 g of the coupling component of the formula

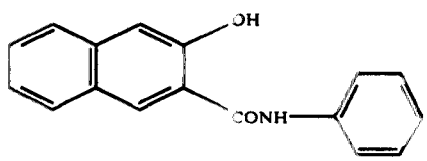

is stirred to a paste with
  8 g of sulphonated castor oil (Turkey-red oil) and
  8 g of NaOH 36°Be, and the paste is dissolved in
226 g of boiling water.
After the addition of
  30 g of a fatty alcohol oxyethylation product (addition product of 18 moles of ethylene oxide with a mixture of alcohols having 11 to 18 carbon atoms), there is added, with vigorous stirring, 21 g of stabilised diazo salt of the amine of the formula

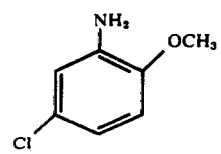

and together with the above coupling component the whole is coupled to form a red dyestuff. This is subsequently neutralised with
  20 g of 25% aqueous ammonia.
There are afterwards added:
  400 g of sodium alginate thickening (5%-aqueous),
  100 g of urea,
  30 g of NaHCO$_3$ and
  30 g of the dyestuff of the formula

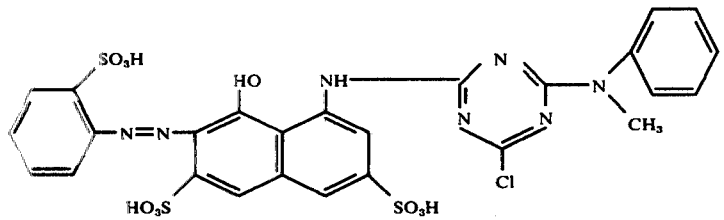

whereupon the mixture is made up with water to 1000 g total weight.

If there are used, instead of the coupling component, the stabilised diazo salt of the amine and the reactive dyestuff given in Example 1, in each case the ones shown in the following Table I in the stated amounts, with otherwise the same procedure, then equally suitable printing pastes are obtained.

TABLE I

| Ex. No. | Coupling component | Diazo salt of the amine | Reactive dyestuff |
|---|---|---|---|
| 2 | Biphenyl bis-acetoacetamide derivative (NH—CO—CH₂—CO—CH₃ on each ring with H₃C substituents), 8 g | 4-chloro-2-methylaniline, 26 g | Bis-azo reactive dyestuff with dichlorotriazine and m-sulfophenylamino group, 30 g |
| 3 | " | " | Bis-azo reactive dyestuff with dichloropyrimidine and p-sulfophenylamino group, 30 g |
| 4 | " | 2-amino-4-chloroanisole, 25.5 g | Bis-azo reactive dyestuff with monochlorotriazine–morpholine group, 30 g |

TABLE I-continued

| Ex. No. | II Coupling component | III Diazo salt of the amine | IV Reactive dyestuff |
|---|---|---|---|
| 5 | 3-hydroxy-2-naphthoyl anilide (8 g) | 3,5-dichloroaniline (24.75 g) | [structure: disazo dye with naphthalene-trisulfonic acid coupled to aniline-CONH-naphthol bearing dichlorotriazinylamino group] (30 g) |
| 6 | " | 3-chloroaniline (19.75 g) | [structure: naphthol-sulfonic acid azo coupled to aniline bearing N-methyl-dichlorotriazinyl group with tolylsulfonic acid substituent, mixture 1:1 m-/p-] (30 g) |
| 7 | " | 2-methyl-4-chloroaniline (21.5 g) | [structure: 1-hydroxy-4-sulfo-naphthalene azo coupled via sulfophenyl to aniline-disulfonic acid bearing dichlorotriazinylamino group] (30 g) |
| 8 | " | 2-methyl-4-chloroaniline (21.5 g) | [structure: methoxy-sulfophenyl azo coupled to hydroxy-sulfo-naphthalene bearing N-methyl-chloro-methoxy-triazinylamino group] (30 g) |

TABLE I-continued

| Ex. No. | II Coupling component | III Diazo salt of the amine | IV Reactive dyestuff |
|---|---|---|---|
| 9 | [3-hydroxy-2-naphthanilide structure] 8 g | [diamine with OCH₃ and CH₃O, CN substituents] 19.25 g | [reactive dye structure with SO₃H, HO, N=N, phenyl-CH₃ and chloro-triazine groups] |
| 10 | " | [o-tolyl-azo-toluidine structure] 31.5 g | [disazo naphthalene dye with SO₃H groups and dichlorotriazine] 30 g |
| 11 | " | [diamine with OCH₃, CH₃O, CN] 19.25 g | [copper-complex azo dye with SO₃H, HO₃S and chloro-triazine, R=$C_6H_5O$ and $NH_2$ mixture] 30 g |
| 12 | " | [bis-amino-dimethoxybiphenyl] 2 g | [CuPc 3,3',3'',3'''-$(SO_3H)_x$ $(SO_2NH_2)_y$ $(SO_2NH-CH_2CH_2-NH)_z$ with chloro-triazinyl-aminobenzenesulfonic acid, x+y+z=4, z=2] 30 g |

TABLE I-continued

| Ex. No. | II Coupling component | III Diazo salt of the amine | IV Reactive dyestuff |
|---|---|---|---|
| 13 | 3-hydroxy-2-naphthanilide (OH, NHCO-phenyl) 8 g | 3,3'-dimethoxybenzidine (o,o'-dianisidine) 18.25 g | Azo dye with aminochlorotriazine reactive group, naphthol-sulfonic acid coupled structure, copper complex (1:1) |
| 14 | — | diphenylamine-4-amine 10.75 g | Mixture of dyestuffs (87.5 T + 12.5 T); triazine-based reactive dye, 30 g |
| 15 | 3-hydroxy-2-naphthanilide (OH, CONH-phenyl) 8 g | 2-methoxy-5-chloroaniline 21 g | Azo dye with dichlorofluoropyrimidine reactive group, naphthol-sulfonic acid, 30 g |

| Ex. No. | II Coupling component | III Diazo salt of the amine | IV Reactive dyestuff |
|---|---|---|---|
| 16 | " | " | (complex structure with SO₃H, NH, Cl, triazine bearing C(CH₃)₂OCH₃ group, linked via triazinyl-NH to H-acid coupled with tolyl-SO₃H azo component) 30 g |
| 17 | 3-cyano-1-ethyl-4-methyl-6-hydroxy-2-pyridone 8 g | 2,5-dichloroaniline 25 g | Dyestuff from Example 2, 30 g |
| 18 | " 8 g | 2-amino-4'-chlorodiphenyl ether (4-chloro) 25 g | Dyestuff from Example 4, 30 g |
| 19 | " 8 g | 2-methoxy-5-chloroaniline 25 g | Dyestuff from Example 5, 30 g |
| 20 | " 8 g | 5-amino-2-methoxy-4-methyl-phenyl phenoxy-NHCO derivative 30 g | Dyestuff from Example 8, 30 g |

TABLE I-continued

| Ex. No. | II Coupling component | III Diazo salt of the amine | IV Reactive dyestuff |
|---|---|---|---|
| 21 | " 8 g | 2-methyl-2'-methyl-4-amino azobenzene, 30 g | Dyestuff from Example 15, 30 g |
| 22 | 3-cyano-4-methyl-1-ethyl-6-hydroxy-pyridone, 8 g | 2,5-dimethoxy-4-phenylcarbonylamino aniline, 25 g | Dyestuff from Example 11, 30 g |
| 23 | " 8 g | 3-methoxy-4-amino-diphenylamine, 30 g | Dyestuff from Example 13, 30 g |
| 24 | 3-hydroxy-2-naphthoic acid (3-nitrophenyl)amide, 8 g | 2-methoxy-5-nitro aniline, 20 g | Dyestuff from Example 8, 30 g |
| 25 | 3-hydroxy-2-naphthoic acid (2-methylphenyl)amide, 8 g | 3-chloroaniline, 20 g | Dyestuff from Example 6, 30 g |

TABLE I-continued

| Ex. No. | Coupling component | Diazo salt of the amine | Reactive dyestuff |
|---|---|---|---|
| 26 | 2-hydroxy-N-(2,5-dimethoxy-4-chlorophenyl)-3-naphthamide, 8 g | 3-amino-4-methoxy-N,N-diethylbenzenesulfonamide, 25 g | Dyestuff from Example 9, 30 g |
| 27 | 2-hydroxy-N-(2-methyl-4-methoxyphenyl)-3-naphthamide, 8 g | 4-amino-5-chloro-2-methoxydiphenylamine (NHCO-phenyl), 30 g | Dyestuff from Example 11, 30 g |
| 28 | N-(2-methoxy-4-chloro-5-methoxyphenyl)-acetoacetamide, 8 g | 2-amino-toluene (NH₂, CH₃, Cl), 20 g | Dyestuff from Example 2, 30 g |
| 29 | 3-hydroxy-N-(2-methoxyphenyl)-2-naphthamide, 8 g | 2-amino-4-chloro-benzotrifluoride, 20 g | Dyestuff from Example 6, 30 g |
| 30 | 3-hydroxy-N-(2-methylphenyl)-2-naphthamide, 8 g | 4-amino-diphenylamine, 10.75 g | Mixture of dyestuffs (structure shown: naphthalene core with OH, NH₂, two SO₃H, bis-azo linked to 2,5-disulfophenyl and to 4-sulfo-phenyl-NH-triazine (Cl, NH₂), 73 T) |

TABLE I-continued
| Ex. No. | Coupling component | Diazo salt of the amine | Reactive dyestuff |
|---|---|---|---|
| 23 T | | | 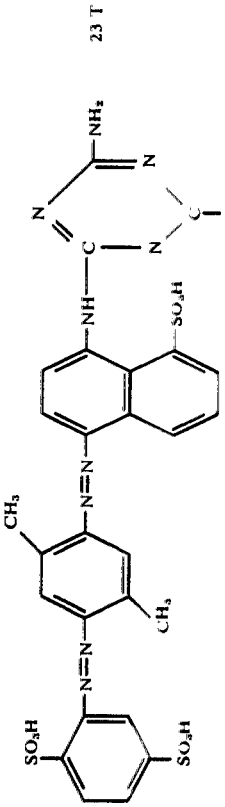 |
| 4 T | | | 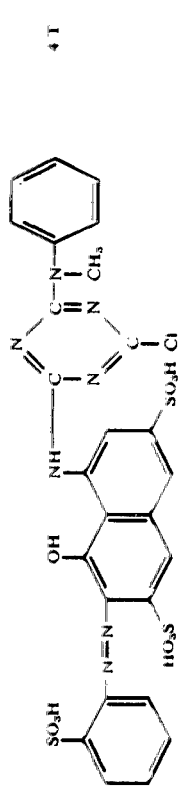 80 g |

EXAMPLE 31

A printing paste is produced according to the details given in Example 1, but without the addition of 100 g of urea and 30 g of sodium bicarbonate, and with the use of 30 g of the reactive dyestuff according to Example 16; there is obtained, with otherwise the same procedure, an equally suitable printing paste.

B. APPLICATION OF THE PRINTING PASTES

EXAMPLE 32

A mixed fabric, ready for printing, consisting of 50% of polyester and 50% of cotton is printed in the screen printing process with a printing paste produced according to Examples 1 to 30; it is subsequently dried, and thermofixed for 1 minute at 200° C. The dyestuff constituents not fixed are removed by subsequent cold washing and by washing at boiling temperature. There are obtained printings dyed tone-in-tone which, by virtue of the ease with which they can be washed out, have good fastness properties, and which have the shades given in the following table.

Table II

| Printing paste according to Ex. | Shade on mixed fabric made from polyester/cotton 50:50 |
|---|---|
| 1 | red |
| 2 | greenish yellow |
| 3 | greenish yellow |
| 4 | reddish yellow |
| 5 | orange |
| 6 | reddish orange |
| 7 | yellowish red |
| 8 | red |
| 9 | bluish red |
| 10 | reddish brown |
| 11 | violet |
| 12 | greenish blue |
| 13 | blue |
| 14 | navy blue |
| 15 | red |
| 16 | red |
| 17 | yellow |
| 18 | gold-yellow |
| 19 | orange |
| 20 | rust red |
| 21 | red |
| 22 | violet |
| 23 | blue |
| 24 | red |
| 25 | reddish orange |
| 26 | bluish red |
| 27 | violet |
| 28 | greenish yellow |
| 29 | reddish orange |
| 30 | black |

If the mixed fabric after drying is thermofixed not for 1 minute at 200° C but for 8 minutes at 180° C with superheated steam or for 20 minutes with pressurised steam (1.5 bars excess pressure), with otherwise the same procedure, then analogous printings having equally good fastness properties are obtained.

If there are used printing pastes which contain the corresponding disperse dyestuff in commercial form, with the procedure otherwise being the same, then less deeply coloured and duller shades are obtained; the resulting printings are moreover less fast to wet processing, and there is a more severe staining of the white ground thereof.

EXAMPLE 33

A mixed fabric, ready for printing, consisting of 50% of polyester and 50% of cotton is printed in the screen printing process with a printing paste produced according to Example 31; it is subsequently dried, and then thermofixed for 1 minute at 200° C and afterwards treated for 8 seconds at 102° C in an aqueous alkali bath containing per liter 150 g of calc. sodium carbonate, 100 g of sodium chloride, 70 g of potassium carbonate and 50 ml of aqueous sodium hydroxide solution (36°Be). The constituents not fixed are removed by subsequent cold washing and washing at boiling temperature. There is obtained a deep red printing having very good fastness properties.

EXAMPLE 34

If a padding liquor is prepared by the procedure described in Example 1 except that, instead of 400 g of sodium alginate thickening being added, there are added 100 g of the same thickening and 300 g of water, and if a mixed fabric consisting of 50% of polyester and 50% of cotton is impregnated with this liquor on a padding machine, so that the liquor absorption is about 100%, with the material being subsequently treated as described in Example 32, then there is obtained a mixed fabric dyed tone-in-tone which, by virtue of the ease with which the unfixed dyestuff is washed out, has good fastness properties.

EXAMPLE 35

A printing paste is prepared in the following manner:
8 g of the coupling component of the formula

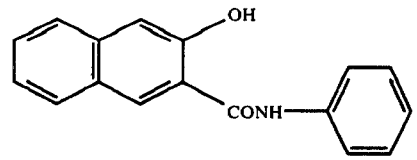

is mixed to a paste with 8 g of sulphonated caster oil (Turkey-red oil) and 8 g of NaOH 36°Be, and the paste is dissolved in 226 g of boiling water. After the addition of 30 g of a fatty alcohol oxyethylation product (addition product of 18 moles of ethylene oxide with a mixture of alcohols having 11 to 18 carbon atoms), there is added, with stirring, 21 g of stabilised diazo salt of the amine of the formula

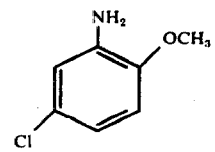

and together with the above coupling component the whole is coupled to form a red dyestuff. There are then added:
- 400 g of locust bean flour thickening (10%-aqueous),
- 100 g of urea,
- 100 g of thiodiethylene glycol,
- 10 g of nonylphenol-diglycol ether sulphate,
- 30 g of 40% acetic acid,
- 30 g of the dyestuff of the formula

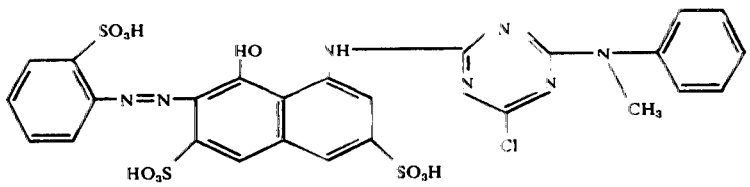

whereupon the mixture is made up with water to 1000 g.

With this printing paste there is printed a mixed fabric consisting of 55% of polyester and 45% of wool in the screen printing process; the material is subsequently dried, and steamed for 45 minutes at 1 bar excess pressure. The unfixed parts of the dyestuffs are removed by washing with cold water and boiling water.

There is obtained a printing dyed tone-in-tone red, which has good fastness properties.

We claim:

1. Process for the printing and pad-dyeing of mixed fabric made from fibre mixtures consisting of materials dyeable with disperse dyestuffs and materials dyeable with reactive dyestuffs by the use of printing pastes or padding liquors containing at least one disperse dyestuff of the azo series and at least one reactive dyestuff, wherein there is used a printing paste or padding liquor in which the disperse dyestuff is formed in the printing paste or padding liquor by the mixing of a coupling component, in the presence of alkalies, with a pasting agent, the subsequent dissolving of the mixture in water, the coupling of the coupling component with a diazo component to form a disperse dyestuff of the azo series, and the subsequent addition of a thickening agent and at least one reactive dyestuff.

2. Process according to claim 1, wherein mixed fabric made from polyester/wool or polyester/cellulose, especially polyester/cotton, is printed or dyed.

3. Process for the preparation of a printing paste or padding liquor containing at least one disperse dyestuff of the azo series and at least one reactive dyestuff, wherein the disperse dyestuff is formed in the printing paste or padding liquor by the mixing of a coupling component, in the presence of alkalies, with a pasting agent, the dissolving of this mixture in water, the coupling of the coupling component with a diazo component to form a disperse dyestuff of the azo series, and subsequently the addition of a thickening agent and at least one reactive dyestuff.

4. Process according to claim 3, wherein there are used, as coupling components and diazo components for the formation of the disperse dyestuff in the printing paste or padding liquor, azoic coupling components and diazo coupling components according to the Colour Index.

5. Process according to claim 3, wherein the coupling component used is of the structure

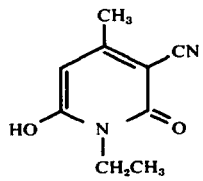

6. The printing paste or paddng liquor obtained by the process of claim 3.

7. The process of claim 1, wherein an anionic or nonionic dispersing agent is added to the printing paste or padding liquor prior to the coupling of the coupling component with the diazo component.

8. The process of claim 3, wherein an anionic or nonionic dispersing agent is added to the printing paste or padding liquor prior to the coupling of the coupling component with the diazo component.

* * * * *